(12) United States Patent
Roeglinger (10) Patent No.: US 11,592,809 B2
(45) Date of Patent: Feb. 28, 2023

(54) SYSTEM AND METHOD FOR MEASUREMENT DATA MANAGEMENT IN A DISTRIBUTED ENVIRONMENT

(71) Applicant: Rohde & Schwarz GmbH & Co. KG, Munich (DE)

(72) Inventor: Sebastian Roeglinger, Pfaffenhofen (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 482 days.

(21) Appl. No.: 16/699,206

(22) Filed: Nov. 29, 2019

(65) Prior Publication Data

US 2021/0165402 A1    Jun. 3, 2021

(51) Int. Cl.
G05B 23/02    (2006.01)
G06F 16/907   (2019.01)
G05B 19/042   (2006.01)

(52) U.S. Cl.
CPC ..... G05B 23/0216 (2013.01); G05B 19/0425 (2013.01); G05B 23/0294 (2013.01); G06F 16/907 (2019.01)

(58) Field of Classification Search
CPC .............. G06F 16/907; G05B 23/0216; G05B 23/0294; G05B 19/0424
See application file for complete search history.

(56) References Cited

U.S. PATENT DOCUMENTS 6,768,324 B1     7/2004  Yamada et al.
11,321,341 B2*   5/2022  Chandhoke ........... G06F 16/164
2006/0265173 A1* 11/2006 Mishima .............. G01N 15/147
                                                  702/118
2007/0124116 A1*  5/2007 Liu ....................... G01D 21/00
                                                  707/E17.143
2010/0287456 A1  11/2010  Chang et al.
(Continued)

FOREIGN PATENT DOCUMENTS

CN    101887403 A    11/2010
CN    101951552 A     1/2011
(Continued)

*Primary Examiner* — Robert W Beausoliel, Jr.
*Assistant Examiner* — Susan F Rayyan
(74) *Attorney, Agent, or Firm* — Ditthavong, Steiner & Mlotkowski (57) ABSTRACT

A system is provided for measurement data management in a distributed environment. The system comprises at least one storage system adapted to obtain raw measurement data or intermediate results from at least one measurement site via a network. In addition, the system further comprises a database, operatively connected to the said storage system, adapted to be accessed remotely by the measurement site via the network. The storage system or the measurement site is further adapted to perform successive processing steps on the raw measurement data along a process chain in order to generate measurement results, whereby associating metadata with the raw measurement data and with the measurement results. In this context, the metadata associated with each measurement result of the successive processing steps is provided with a new reference as well as a reference to the reference of the measurement result from the preceding processing step.

25 Claims, 8 Drawing Sheets

(56) References Cited

U.S. PATENT DOCUMENTS

| | | | |
|---|---|---|---|
| 2017/0102678 A1* | 4/2017 | Nixon | G05B 17/02 |
| 2017/0262508 A1* | 9/2017 | Garcia | H04L 43/067 |
| 2018/0033284 A1* | 2/2018 | Greenwald | H04Q 9/02 |
| 2018/0351786 A1* | 12/2018 | Pope | H04L 67/34 |
| 2019/0266165 A1* | 8/2019 | Yamato | G06F 16/00 |
| 2020/0019717 A1* | 1/2020 | Steffey | H04L 9/3239 |
| 2021/0026991 A1* | 1/2021 | Ossig | G06Q 10/0838 |
| 2021/0357421 A1* | 11/2021 | Chandhoke | G06F 16/164 |

FOREIGN PATENT DOCUMENTS

| | | |
|---|---|---|
| CN | 104318407 A | 1/2015 |
| CN | 106021437 A | 10/2016 |
| CN | 107526541 A | 12/2017 |
| CN | 109542925 A | 3/2019 |
| EP | 1690162 A2 | 8/2006 |
| WO | 2005050390 A2 | 6/2005 |
| WO | 2019048481 A1 | 3/2019 |

* cited by examiner

SYSTEM AND METHOD FOR MEASUREMENT DATA MANAGEMENT IN A DISTRIBUTED ENVIRONMENT

TECHNICAL FIELD

The invention relates to measurement data management in a distributed or network environment, especially for facilitating the distributed computing power to process the measurement data.

BACKGROUND ART

Generally, network based data processing allows for convenient, mobile and collaborated data management especially for handling extremely large amounts of data and information. In the case of processing a high volume of measurement data, the utilization of networked computing power can be advantageous from either a customer or a production manager point of view. It is further beneficial that the measurement data or their subsequent processed results can be accessed by a remote user and can be processed off-line. The networked storage additionally provides for a greater number of flexibility for data management in terms of public storage option, private storage option or a hybrid storage of the foregoing options.

For example, the document WO 2019/048481 A1 shows methods for organizing and processing data in a cloud environment that utilize encrypted meta data blocks reflecting information about objects of interest represented by the data content. Upon the decryption of the encrypted meta data blocks, they are fused into new meta data blocks if a criterion regarding the object of interest is fulfilled. Furthermore, a block chain is used in order to store the data content. However, the data processing is limited to the generation of meta data since the fusion nodes do not generate new data chunks. In case of measurement data, they are generally processed along a number of intermediate steps thereby generating intermediate results, which are required to be traced along with the raw measurement data. Furthermore, storing data content in a chain requires significant data management resources.

Accordingly, there is a need to provide a system and a method to mitigate the above limitations and to offer an effective and reliable scheme for measurement data management in a networked or distributed environment.

SUMMARY OF THE INVENTION

According to a first aspect of the invention, a system for measurement data management in a distributed environment is provided. The system comprises at least one storage system adapted to obtain raw measurement data and/or intermediate results from at least one measurement site via a network. In addition, the system further comprises a database, operatively connected to the said storage system, adapted to be accessed remotely by the measurement site via the network. The storage system and/or the measurement site is further adapted to perform successive processing steps on the raw measurement data along a process chain in order to generate measurement results, whereby associating metadata with the raw measurement data and with the measurement results. In this context, the metadata associated with each measurement result of the successive processing steps is provided with a new reference as well as a reference to the reference of the measurement result from the preceding processing step.

Furthermore, the reference included in the metadata associated with the raw measurement data and the measurement results are created based on the raw data and/or the results. In this regard, the metadata associated with the raw measurement data may also include identifications and settings of the measurement devices, which are performing specific measurements on a device under test and thereby creating the raw data (e.g., I/Q data), the description of the device under test, input signal description, identifications and settings for the signal generators, or any combination thereof. The metadata may further include location of the measurement site, time and date of the data creation, identification of the operator/user responsible for the measurements and so on.

Therefore, metadata are used to create chain relationships between the raw measurement data and each measurement result from the successive processing steps of the process chain. As a consequence, a user can advantageously trace the raw data as well as any specific processed data along the process chain. In this way, the user can later start from any point along the process chain and can implement a new set of processing steps from that point instead of starting from the raw data.

According to a first preferred implementation form of said first aspect of the invention, the storage system is further adapted to define an algorithm respectively required to calculate the measurement results for each successive processing step. In this context, the references provided with the metadata associated with each measurement result of the successive processing steps are unique references. Moreover, the storage system is further adapted to include a reference for the respective algorithms into the metadata associated with the measurement results. Hence, an algorithm that calculates a processed result from the output of the preceding processing step is advantageously referenced in the metadata and therefore can be identified along the process chain with ease.

According to a second preferred implementation of said first aspect of the invention, the system is implemented in a cloud environment, whereby the storage system corresponds to a cloud server and the database corresponds to a cloud database. Advantageously, cloud computing power can be utilized for processing the measurement data and/or for further processing the intermediate results, especially in the case of high volume of processed data.

According to a further preferred implementation form of said first aspect of the invention, the measurement site is further adapted to store the measurement results, the algorithms and the metadata locally. Advantageously, the data and/or results with high data volume can be stored locally at the measurement site, which significantly reduces the overall network usage.

According to a further preferred implementation form of said first aspect of the invention, the storage system is further adapted to store the measurement results, the algorithms and the metadata into the database. Advantageously, the subsequent storing of each the raw measurement data and processed results in a chain is not required. Instead, only the processing steps are stored in a chain along with the reference to the raw measurement data and the respective processing algorithms.

According to a further preferred implementation form of said first aspect of the invention, the storage system is further adapted to include criteria into the metadata associated with each measurement result of the successive processing steps in order to discard the respective measurement results from the database. Such criteria can be defined, for instance, based on the duration or period of the usage for any specific data/results and how long the data/results are to be stored if they are not currently utilized by the user.

According to a further preferred implementation form of said first aspect of the invention, the system further comprises a housekeeping system, operatively connected to the database, adapted to discard the measurement results from the database based on the criteria included into the metadata associated with each measurement result of the successive processing steps. Therefore, the housekeeping system searches the intermediate results that might be deleted and deletes the results from the database if the specified criteria are fulfilled. For instance, if a criterion is defined as one month period of storage, the housekeeping system may delete any intermediate results from the database if no user used the results for one month.

Advantageously, the housekeeping system prevents the storage system from being congested by detecting unused intermediate results that can be deleted while keeping the final results/verdicts and the metadata in the database for effectively tracking the respective processing steps. If at a later date, the deleted results are required to be regenerated, the storage system can utilize the metadata of the process chain to identify the relating measurement data to start with as well as the processing steps that are required to be performed.

According to a further preferred implementation form of said first aspect of the invention, the system further comprises a user interface, operatively connected to the storage system, adapted to convey interactions from a remote user to the storage system. Advantageously, the measurement data/results and the processing steps (e.g., algorithms) can be shared among the remote users, thereby allowing for post-processing of the data locally at remote locations either on-line or off-line.

According to a further preferred implementation form of said first aspect of the invention, the user interface is further adapted to implement filtration on the process chain and whereby the remote user is able to specify batch processing on the measurement results from more than one processing step. In addition, the remote user may use the filtration procedure to specify batch processing on several measurement results in more than one process chain, for example, sub-process chains comprising a different set of signal processing steps.

According to a further preferred implementation form of said first aspect of the invention, the storage system is further adapted to transmit all or a portion of the measurement results to the remote user based on the filtration implemented in the user interface. Therefore, the storage system acting as a cloud server may execute the processing steps on cloud and only transmits the final result/verdict over the network as per the requests of remote users. Moreover, while several intermediate results are computed on the server, the computing processes are carried out until a result that comprises a small amount of data is obtained, which then is transmitted to the remote user. Advantageously, least amount of data are transmitted over the network that significantly reduces network usage.

According to a further preferred implementation form of said first aspect of the invention, the measurement site is further adapted to transmit all or portion of the measurement results to the remote user and/or to the database base on the volume of transmitted data and network availability. For instance, the measurement site may store the raw measurement data and the intermediate results locally at the measurement site and only transmits metadata chain to the database or to the remote user. Furthermore, the measurement site may compute several intermediate results on site until a result that corresponds to a small amount of data is obtained, which then can be transmitted to the database or to the remote user distributed over the network. As a result, it is possible to store all or most of the data and/or results at the measurement site and to transmit only the data-light information through the network.

According to a further preferred implementation form of said first aspect of the invention, the measurement site is further adapted store the measurement data and/or intermediate results with high data volume at the measurement site based on the network traffic for data transmission. In this context, the measurement site may store the data and/or results locally until there is low network traffic for data transmission and then transmit the data and/or results to the database or to the remote user.

According to a further preferred implementation form of said first aspect of the invention, the measurement site comprises computing nodes adapted to process the raw measurement data on site through the successive processing steps and further adapted to track the data and/results stored at the measurement site. In this context, the measuring device itself that performs the predefined measurements locally can perform the local processing. Alternately, on site computers can perform the successive processing and tracking of the measurement data, thereby facilitating remote computing nodes distributed over the network.

According to a further preferred implementation form of said first aspect of the invention, the storage system is further adapted to obtain the raw measurement data from the measurement site based on a request made by the remote user. In addition, the measurement site is further adapted to store the raw measurement data and the measurement results on measuring instruments or measurement devices at the measurement site until requested by the remote user.

Alternatively, the raw measurement data (e.g., I/Q data) from the measurement devices can be pushed to the network automatically or via commands generated at the measurement site. Advantageously, the high volume of raw measurement data can be stored at the measurement site in order to avoid storing large amounts of data in the network. The high volume data can be fetched from the measurement site, particularly from the measurement devices to a remote location based on the request of a remote user.

According to a further preferred implementation form of said first aspect of the invention, the unique reference is a checksum adapted to prevent the duplicative storing of data into the cloud database. Preferably, the unique reference is a SHA-checksum (e.g., SHA256) that advantageously prevents any collision for multiple remote users. Alternatively, the unique reference can be a Universally Unique Identifier (UUID).

According to a second aspect of the invention, a method for measurement data management in a distributed environment is provided. The method comprises the step of obtaining raw measurement data from at least one measurement site via a network. In addition, the method comprises the step of performing successive processing steps on the raw measurement data along a process chain in order to generate measurement results. Furthermore, the method comprises the step of associating metadata with the raw measurement data and with the measurement results.

In this context, the metadata associated with each measurement result of the successive processing steps is provided with a new reference as well as a reference to the reference of the measurement result from the preceding processing step. Therefore, metadata are used to create chain relationships between the raw measurement data and each measurement result from the successive processing steps of the process chain. As a result, a user can advantageously trace the raw data as well as any specific processed data along the process chain.

According to a first preferred implementation form of said second aspect of the invention, the method further comprises the step of defining an algorithm respectively required to calculate the measurement results for each successive processing step, whereby the references are unique references. Moreover, the method further comprises the step of including a reference for the respective algorithms into the metadata associated with the measurement results. Advantageously, an algorithm that calculates a processed result from the output of the preceding processing step is additionally referenced in the metadata and therefore can be identified along the process chain with ease.

According to a second preferred implementation form of said second aspect of the invention, the method further comprises the step of storing the measurement results, the algorithms and the metadata into a database. Advantageously, only the processing steps referencing the raw measurement data and the respective processing algorithms are stored in a chain instead of performing subsequent storing of the raw measurement data in a chain.

According to a further preferred implementation form of said second aspect of the invention, the method further comprises the step of including criteria into the metadata associated with each measurement result of the successive processing steps in order to discard the respective measurement results from the database. Such criteria can be defined, for instance, based on the duration or period of the usage for any specific data/results and how long the data/results are to be stored if they are not currently utilized by the user.

According to a further preferred implementation form of said second aspect of the invention, the method further comprises the step of discarding the measurement results from the database based on the criteria included into the metadata associated with each measurement result of the successive processing steps. Advantageously, the distributed environment, especially the cloud database, is prevented from being overloaded by detecting and thereby deleting unused intermediate results.

According to a further preferred implementation form of said second aspect of the invention, the method further comprises the step of implementing filtration on the process chain in order to specify batch processing on the measurement results from more than one processing step by a remote user. Additionally, the remote user may use the filtration procedure to specify batch processing on several measurement results in more than one process chain, for example, sub-process chains comprising a different set of signal processing steps.

According to a further preferred implementation form of said second aspect of the invention, the method further comprises the step of transmitting all or a portion of the measurement results to the remote user based on the filtration. Advantageously, least amount of data are transmitted over the network that significantly reduces network usage.

According to a further preferred implementation form of said second aspect of the invention, the method further comprises the step of obtaining the raw measurement data from the measurement site based on a request made by the remote user. Advantageously, the high volume of raw measurement data can be stored at the measurement site in order to avoid storing large amounts of data in the network, e.g., in the cloud.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. However, the following embodiments of the present invention may be variously modified and the range of the present invention is not limited by the following embodiments.

Figure 1:
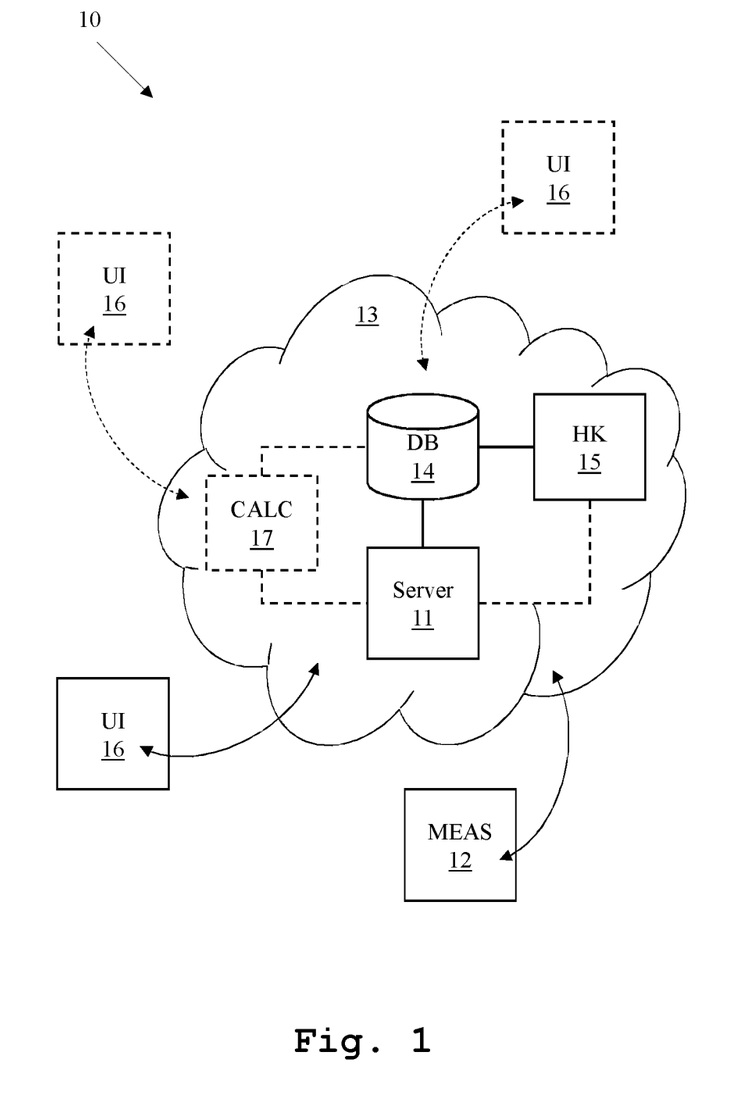
FIG. 1 shows a first exemplary embodiment of the system according to the first aspect of the invention.

In FIG. 1, a first exemplary embodiment of the system 10 according to the first aspect of the invention is illustrated. Preferably, the system 10 is realized on a cloud environment comprising a storage system implemented herein as a cloud server 11, which communicates with one or more measurement sites 12 via a distributed network 13. The server 11 can be comprehended as a logical server that provides a cloud computing platform over the network 13. Alternately, the server 11 can be realized as a physical server (e.g., a dedicated cloud server) that can be accessed remotely through the network 13. In either case, the server 11 may include a plurality of computing nodes or resources for executing several processing steps along a process chain successively or asynchronously.

The system 10 further includes a database, herein implemented as a cloud database 14 or repositories, which can be accessed through the network 13 from remote locations (e.g., cloned repositories). The cloud database 14 is supplemented with a housekeeping system 15 that can access the data stored in the cloud database 14 and can further search/erase data if necessary. The server 11 allows user interactions into the cloud platform via a user interface 16, which can be distributed at remote locations through the network 13. The user interface 16 permits a remote user to send requests to the server 11 for specific processed data/results as well as to transmit processed results into the server 11 resp. the database 14 that are calculated off-line. Hence, a remote user can utilize the cloud computing power for processing the measurement data as well as can use the same setup off-line on a laptop if necessary.

In order to trace the data processing steps regarding the raw measurement data, metadata are associated with the measurement data and further with the results from the successive processing steps. Such arrangement of process execution creates a chain relationship between the raw measurement data and each intermediate results. Furthermore, the algorithms for respective processing steps are identified and are stored in the cloud along with the metadata and the results. The remote user can clone all or parts of the repositories 14 on its own location and therefore can perform post-processing of the data/results locally without being connected to the network 13. A calc-system 17 can be optionally included into the cloud that accepts batch jobs, where a remote user can specify which measurement data should be processed, which processing step should be executed, which algorithm should be used and so on.

Figure 2:
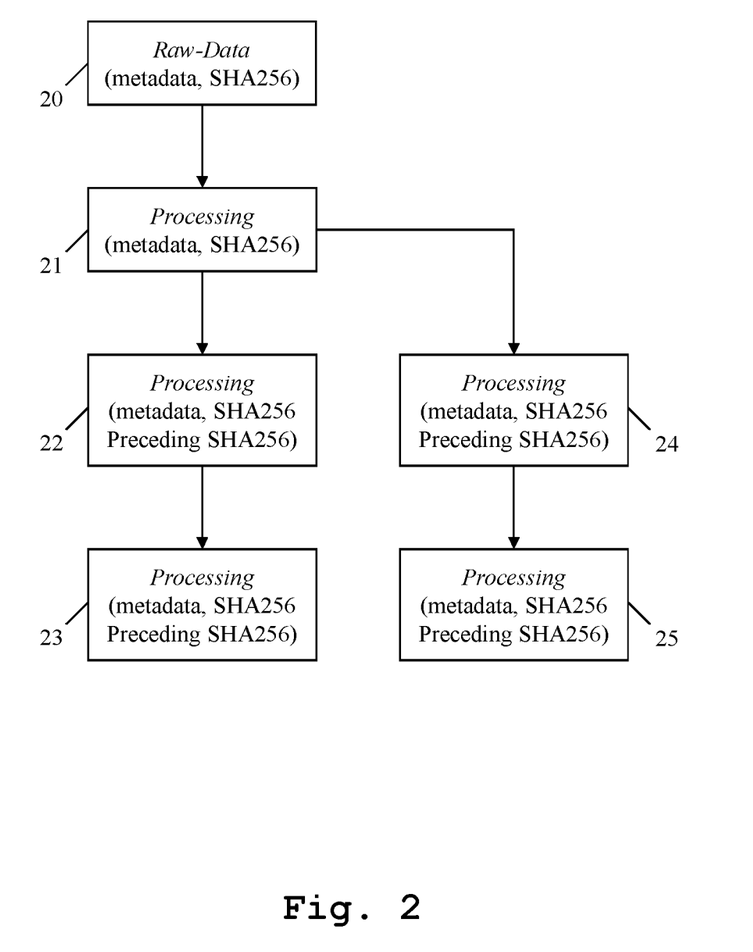
FIG. 2 shows a first exemplary embodiment for executing the processing steps according to the first aspect of the invention.

In FIG. 2, a first exemplary embodiment for executing the processing steps according to the first aspect of the invention is illustrated. In particular, an execution of one or more process chains are illustrated herein in blocks. Along the first process chain, raw-data are obtained 20 at the measurement device regarding the nature of measurement performed on a device under test (DUT) at the measurement site 12. The raw-data can be processed along a first processing step 21, a second processing step 22 using the output of the first processing step 21 and further along a third processing step 23 using the output of the second processing step 23. In addition, the process execution can be branched into a second process chain, whereby executing an additional processing step 24 using the output of the first processing step 21 of the first process chain. The second process chain may comprise further processing steps 25 that can be executed in a successive order independent of the first process chain.

For example, if an adjacent channel leakage ratio (ACLR) measurement is performed along the first process chain, the raw-data acquisition 20 can be performed by sampling the time domain outputs of a DUT and by creating I/Q data. Along the first processing step 21, several spectrums over time are calculated on the I/Q data using a Fast Fourier Transformation (FFT). Along the second processing step 22, an average power calculation for the several FFTs is performed for the channel and the adjacent channels. Finally, along the third processing step 23, an ACLR calculation is performed from the average calculated in the preceding step 22. The process chain is stored in cloud associated with unique references representing the successive steps 20,21, 22,23, which results in a chain relationship between the steps 20,21,22,23.

The benefit is, if at a later date, a max-hold version of the ACLR is required, the first process chain can be branched into a second process chain that starts with the second processing step 21 of the ACLR measurement instead of starting with the I/Q data acquisition 20. The results of the second processing step 21 of the ACLR measurement can be promptly utilized along the first processing step 24 of the max-hold version in order to calculate max-hold for several FFT spectrums over time. Successively, along the second processing step 25 of the max-hold version, a further ACLR calculation is performed based on the results of the preceding step 24.

In this regard, the raw-data are associated with metadata including information regarding checksum algorithm (e.g., SHA256), measurement device ID, measurement device settings, DUT description, input signal description, signal generating device ID, signal generating device settings, etc. Each successive processing step 21,22,23 resp. 24,25 is further associated with metadata including a new SHA256 checksum, a reference to the predecessor SHA256 checksum of the preceding step, name and version for the computing resource (e.g., DSP) that is executing the step, a condition to delete the intermediate result, etc. The foregoing information are stored in the cloud database 14, thereby allowing effective tracking of the data/results respective to the processing steps.

Moreover, with respect to the foregoing execution scheme, the server 11 can delete some of the results from the steps (e.g., 21,22 resp. 24) and just stores the final results from processing steps that lead towards the measurement verdict (e.g., 23 resp. 25). If at a later date, the server 11 is required to regenerate the results of 21,22 resp. 24, the chain relationship provided in the metadata allows the server 11 to identify the raw-data required to be utilized as well as the processing steps 21,22 resp. 24 required to be executed.

Generally, for remote data processing, a user may clone a part of the database 14 for locally accessing the metadata, the processing steps, and the measurement data. By using checksums, the user can process the data off-line and can push back the result onto the server 11 resp. the database 14. If another user is concurrently using an identical processing, there will be no collisions because of the checksums.

Figure 3:
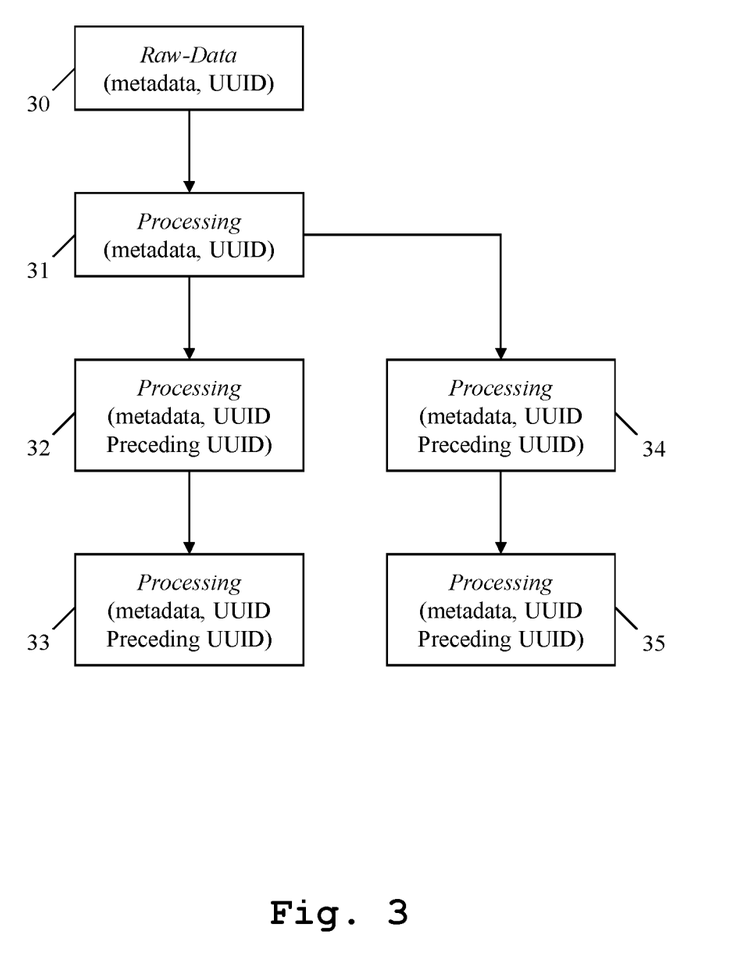
FIG. 3 shows a second exemplary embodiment for executing the processing steps according to the first aspect of the invention.

In FIG. 3, a second exemplary embodiment for executing the processing steps according to the first aspect of the invention is illustrated. In particular, an execution scheme of one or more process chains are illustrated herein in blocks. The execution scheme illustrated herein differs from the scheme illustrated in FIG. 2 in that instead of a checksum, an UUID is used as the unique reference incorporated with the metadata. Likewise, a first process chain can be executed along the steps 30,31,32,33 and if required a second process chain can be branched from the first process chain and can be executed along the steps 34,35.

In this regard, the raw-data are associated with metadata including UUID, measurement device ID, measurement device settings, DUT description, input signal description, signal generating device ID, signal generating device settings, etc. Each successive processing step 31,32,33 resp. 34,35 is further associated with metadata including a new DSP-UUID, a reference to the predecessor DSP-UUID, name and version for the DSP executing the step, a condition to delete the intermediate result, etc. The foregoing information are stored in the cloud database 14, thereby allowing effective tracking of the data/results respective to the processing steps.

Figure 4:
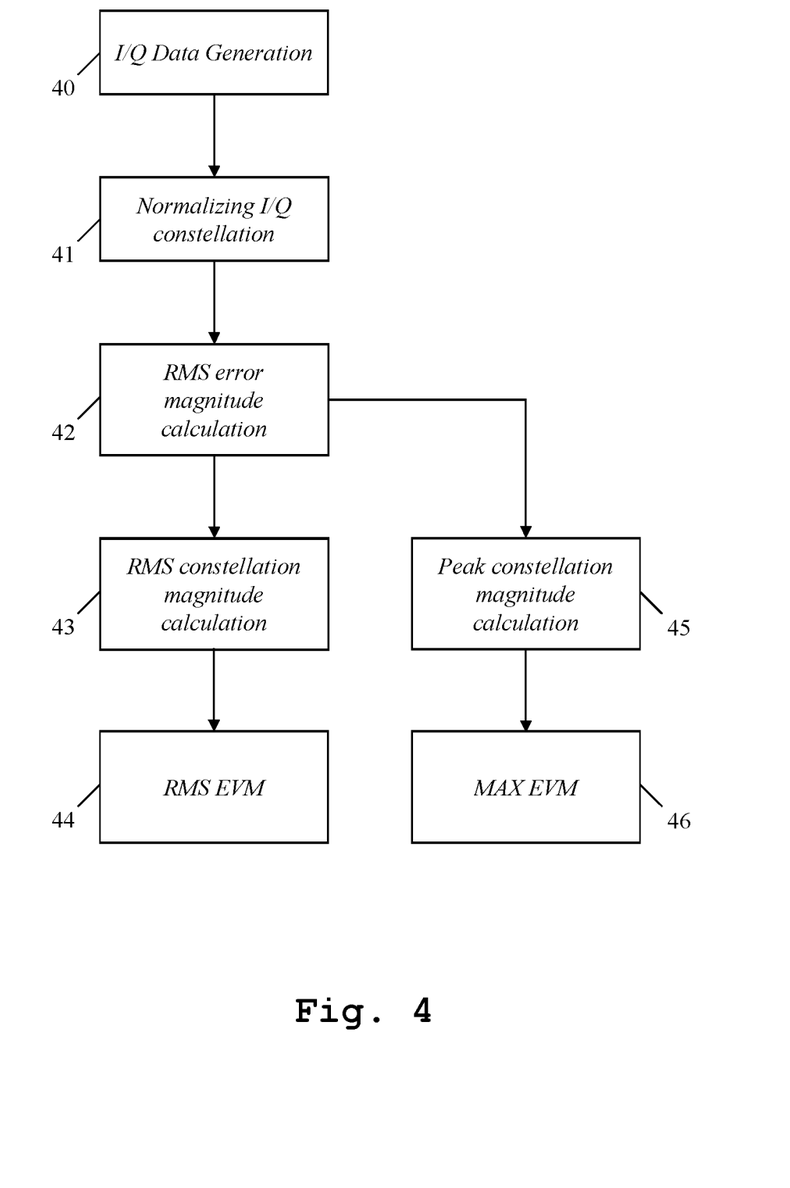
FIG. 4 shows a measurement specific process diagram by way of an example.

In FIG. 4, a measurement specific process diagram is illustrated by way of an example. Especially, a measurement of error vector magnitude (EVM) is performed as a measurement of in-band signal quality. Along the step 40, the raw data acquisition is performed by sampling and creating I/Q data from the DUT output. Along the step 41, the I/Q constellation is normalized over at least one quadrant. At this point, the generated constellation is compared with a reference constellation and an error vector for each symbol is determined as a complex number. Along the step 42, root-mean square (RMS) value of all the error vectors are calculated. Along the step 43, RMS value of the constellation point magnitudes are calculated. Finally, along the step 44, the RMS EVM is determined as a ratio of the RMS value of all the error vectors and the RMS value of the constellation point magnitude. The results from each process steps are successively stored and linked with the results of preceding steps as well with the raw data, thereby formulating a metadata chain.

If after some time, the user wishes to perform max variant of EVM measurement instead of the RMS EVM, the user is not required to start from the raw data acquisition. Rather the user can start from results of step 42, advantageously skipping the steps 40 and 41, and further along step 45, the user may calculate the peak value of the constellation point magnitudes. Then, along the step 46, the MAX EVM is determined as a ratio of the RMS value of all the error vectors and the peak value of the constellation point magnitude. It is further possible to extend the process chain into further sub-chains, for instance, if the user wishes to perform the peak variant of the EVM and can advantageously start from any intermediate steps as defined above.

It is to be noted that the example process chains illustrated in FIG. 2, FIG. 3 and FIG. 4 are not limited to measurement performed on a single DUT. It is possible that a measurement of several different DUTs can be performed over one or more process chains and then providing statistical quantities over many DUTs of the same type.

Figure 5:
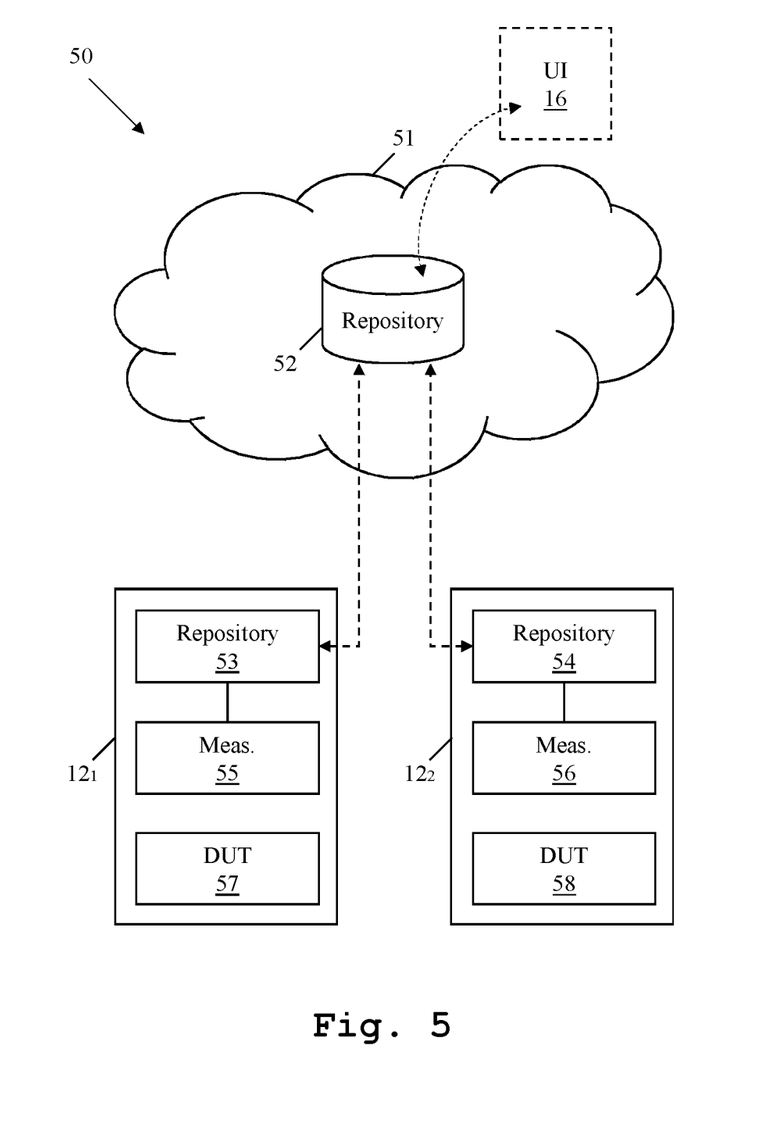
FIG. 5 shows a second exemplary embodiment of the system according to the first aspect of the invention.

In FIG. 5, a second exemplary embodiment of the system 50 is illustrated. The system 50 comprises a plurality of measurement sites $12_1,12_2$ where each measurement site $12_1,12_2$ may perform measurement on one or more DUTs 57,58 either separately or collectively. Each of the measurement site $12_1,12_2$ further performs successive processing steps on the raw measurement data along the process chain thereby generating measurement results. The measurement results are further associated with metadata referencing the raw measurement data.

Here, most or all of the measurement results are stored at the measurement sites $12_1,12_2$, in particular, the data and/or results with high data volume are stored at the measurement sites $12_1,12_2$. A shared database or repository 52 can be used for storage, especially for storing the data locally. The repository 52 can be located in the cloud network of FIG. 1 or can be located in the local network 51 through which the measurement sites $12_1,12_2$ are connected. The measurement sites $12_1,12_2$ are able to access the data locally by cloning the repository 52 at their respective location repository 53,54. The measurement sites $12_1,12_2$ preferably comprises measuring devices 55,56 that are performing specific measurements on the DUTs 57,58 and further processing of the measurement data. Additionally or alternatively, the measurement sites $12_1,12_2$ may comprises additional computational nodes, e.g., computers connected to the measuring devices 55,56 and further connected to the local network 51.

In the case the database 52 is located in the cloud network, the measurement sites $12_1,12_2$ transmits only metadata chain to the server 11 and may transfer the data with high volume until there is low network traffic for transmission. A user interface 16 is then able to capture the results, for instance, the intermediate results of a respective process chain any time necessary. If the user interface 16 requires the raw measurement data, it may request to the respective measurement site $12_1,12_2$ for transmit the raw data. Since the raw data as well as the intermediate results are tracked at the measurement sites $12_1,12_2$, a networked measurement site performing a plurality of measurements also benefits from the arrangement even if the intermediate results are deleted but the raw data are locally stored.

Figure 6:
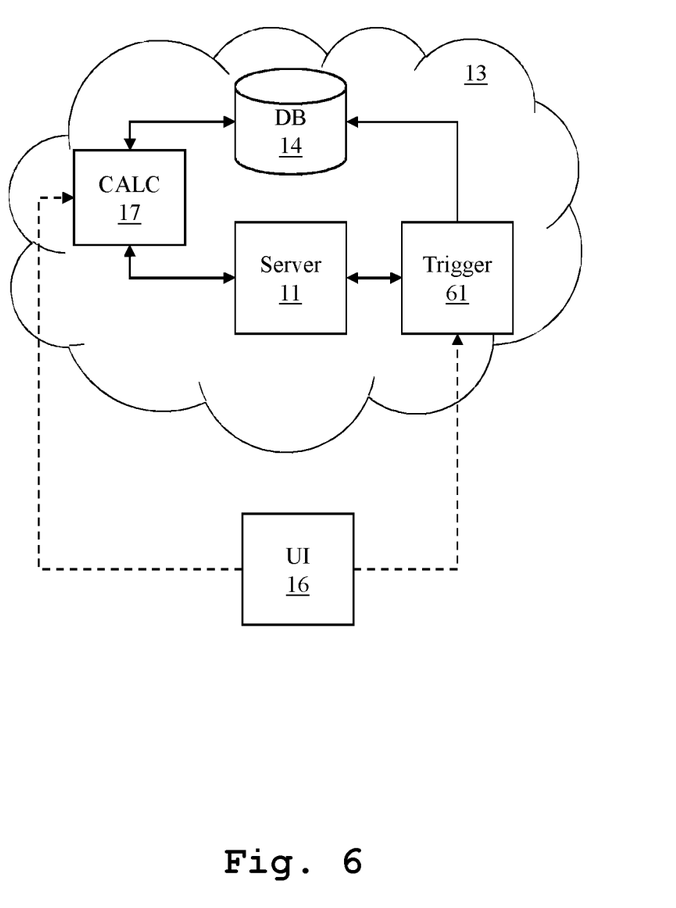
FIG. 6 shows an exemplary data management and batch processing scheme for a user interface.

In FIG. 6, an exemplary data management and batch processing scheme for a user interface 16 is illustrated. An observer or trigger module 61 is herein incorporated in the distributed or cloud network 13, connected to the server 11 and further to the database 14. The user interface 16 is able to communicate with the trigger module 61 in order to define measurement specific triggers, e.g., start EVM, SEM, ACLR etc. measurements automatically. The user interface 16 is further able to delete any predefined measurement specific triggers from the trigger module 61. The trigger module 61 can then instruct the server 11 for processing of the acquired data if new data are pushed in the network or cloud and if the trigger conditions set by the user interface 16 are met. As a result, batch processing of similar measurement data and/or results can be performed, which significantly reduces the amount of human intervention.

The user interface 16 may capture the intermediate results of the process chain as well as the final result of the measurement from the calc-service 17. Particularly, the user interface 16 may configure the calc-service 17 via measurement specific batch jobs based on the filtration on the process chain. The user interface 16 may also capture the results from the database 14 and further the raw measurement data, e.g., via clone repositories, if the raw data are pushed into the cloud 13 and are stored in the database 14.

Figure 7:
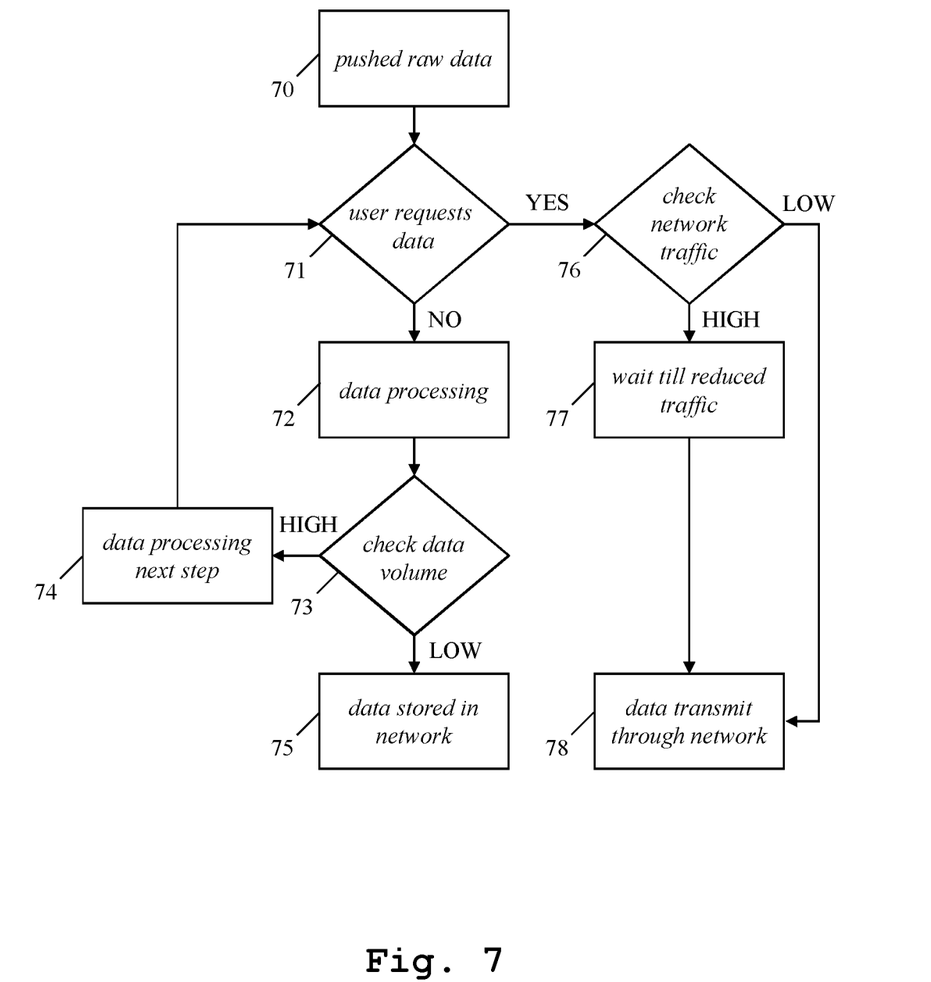
FIG. 7 shows an exemplary process algorithm for data storage and transmission through the network.

In FIG. 7, a process algorithm is illustrated for performing data storing and data transfer through the network by way of an example. The example process algorithm can be executed on the cloud server 11, on the measurement sites $12_1,12_2$, on the remote computational nodes or any combination thereof. Any new data or results that are pushed 70 to the system are checked for whether a remote user requests for the data to be transmitted to its respective remote location 71. If the data is required to be stored only, for instance, in the cloud database 14 or locally at the measurement sites $12_1,12_2$, further data processing are performed 72 along the process chain. At this point, a check is performed 73 on the measurement results whether the results comprise high or low data volume. If the data volume is high, further subsequent process steps are executed until a result with low data volume is obtained. Upon obtaining measurement results with low data volume, the data and/or results are stored 75 in the network, either on the cloud database 14 or locally at the measurement sites $12_1,12_2$.

However, if a user made a request for data transmission, a further check is performed 76 in order to identify the network traffic. If the network traffic is high, the data transmission is halted until the network usage is reduced 77. Upon identifying that the network traffic is adequate or low, the requested data and/or results are transmitted 78 through the network, for instance, to the remote user or to the cloud server 11. Therefore, the exemplary process algorithm determines which results or data to be stored in cloud or in sites, which are to be transmitted to remote locations through the network and further monitors the network capacity in order to optimize these requirements.

Figure 8:
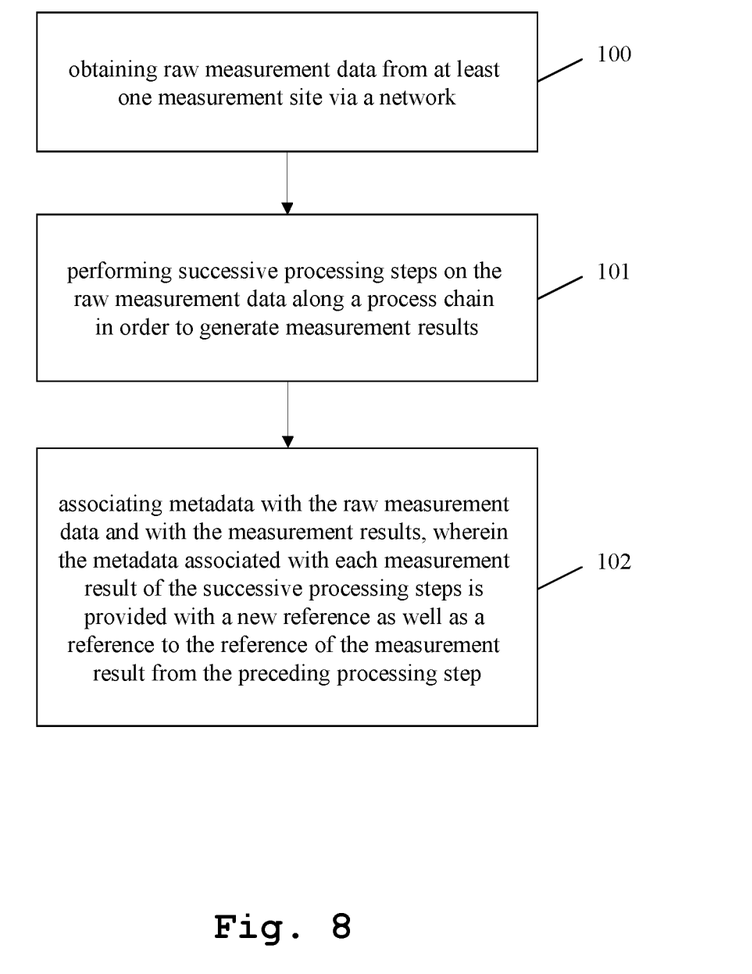
FIG. 8 shows an exemplary embodiment of the method according to the second aspect of the invention.

In FIG. 8, an exemplary embodiment of the method according to the second aspect of the invention is illustrated. In a first step 100, raw measurement data are obtained from at least one measurement site via a network. In a second step 101, successive processing steps are performed on the raw measurement data along a process chain in order to generate measurement results. In a third step 102, metadata are associated with the raw measurement data and with the measurement results, wherein the metadata associated with each measurement result of the successive processing steps is provided with a new reference as well as a reference to the reference of the measurement result from the preceding processing step.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A system for measurement data management comprising:
   at least one storage system adapted to obtain raw measurement data from at least one measurement site via a network, and
   a database, operatively connected to the said storage system, adapted to be accessed remotely by the measurement site via the network;
   wherein the storage system or the measurement site is further adapted to perform successive processing steps on the raw measurement data along a process chain in order to generate measurement results, whereby associating metadata with the raw measurement data and with the measurement results,
   wherein the metadata associated with each measurement result of the successive processing steps is provided with a new unique reference as well as a reference to the new unique reference of the measurement result from the preceding processing step, and
   wherein the new unique reference included in the metadata associated with the measurement results is created based on the raw measurement data and the measurement results.

2. The system according to claim 1,
   wherein the storage system is further adapted to identify an algorithm respectively required to calculate the measurement results for each successive processing step.

3. The system according to claim 1,
   wherein the system is implemented in a cloud environment, whereby the storage system corresponds to a cloud server and the database corresponds to a cloud database.

4. The system according to claim 2,
   wherein the storage system is further adapted to include a reference for the respective algorithms into the metadata associated with the measurement results.

5. The system according to claim 2,
   wherein the measurement site is further adapted to store the measurement results, the algorithms and the metadata locally.

6. The system according to claim 2,
   wherein the storage system is further adapted to store the measurement results, the algorithms and the metadata into the database.

7. The system according to claim 1,
   wherein the storage system is further adapted to include criteria into the metadata associated with each measurement result of the successive processing steps in order to discard the respective measurement results from the database.

8. The system according to claim 7,
   wherein the system further comprises a housekeeping system, operatively connected to the database, adapted to discard the measurement results from the database based on the criteria included into the metadata associated with each measurement result of the successive processing steps.

9. The system according to claim 1,
   wherein the system further comprises a user interface, operatively connected to the storage system, adapted to convey interactions from a remote user to the storage system.

10. The system according to claim 9,
    wherein the user interface is further adapted to implement filtration on the process chain and whereby the remote user is able to specify batch processing on the measurement results from more than one processing step.

11. The system according to claim 10,
    wherein the storage system is further adapted to transmit all or a portion of the measurement results to the remote user based on the filtration implemented in the user interface.

12. The system according to claim 9,
    wherein the measurement site is further adapted to transmit all or portion of the measurement results to the remote user and/or to the database base on the volume of transmitted data and network availability.

13. The system according to claim 9,
    wherein the storage system is further adapted to obtain the raw measurement data from the measurement site based on a request made by the remote user.

14. The system according to claim 9,
    wherein the measurement site is further adapted to store the raw measurement data and the measurement results on measuring instruments at the measurement site until requested by the remote user.

15. The system according to claim 1,
    wherein the new unique reference is a checksum adapted to prevent the duplicative storing of data into the database.

16. The system according to claim 1, wherein
    wherein the new unique reference included in the metadata associated with the raw measurement data is created based on the raw measurement data and the measurement results.

17. A method for measurement data management comprising the steps of:
    obtaining raw measurement data from at least one measurement site via a network,
    performing successive processing steps on the raw measurement data along a process chain in order to generate measurement results, and
    associating metadata with the raw measurement data and with the measurement results,
    wherein the metadata associated with each measurement result of the successive processing steps is provided with a new unique reference as well as a reference to the new unique reference of the measurement result from the preceding processing step, and wherein the new unique reference included in the metadata associated with the measurement results is created based on the raw measurement data and the measurement results.

18. The method according to claim 17,
wherein the method further comprises the step of identifying an algorithm respectively required to calculate the measurement results for each successive processing step.

19. The method according to claim 18,
wherein the method further comprises the step of including a reference for the respective algorithms into the metadata associated with the measurement results.

20. The method according to claim 18,
wherein the method further comprises the step of storing the measurement results, the algorithms and the metadata into a database.

21. The method according to claim 20,
wherein the method further comprises the step of including criteria into the metadata associated with each measurement result of the successive processing steps in order to discard the respective measurement results from the database.

22. The method according to claim 21,
wherein the method further comprises the step of discarding the measurement results from the database based on the criteria included into the metadata associated with each measurement result of the successive processing steps.

23. The method according to claim 17,
wherein the method further comprises the step of implementing filtration on the process chain in order to specify batch processing on the measurement results from more than one processing step by a remote user.

24. The method according to claim 23,
wherein the method further comprises the step of transmitting all or a portion of the measurement results to the remote user based on the filtration.

25. The method according to claim 23,
wherein the method further comprises the step of obtaining the raw measurement data from the measurement site based on a request made by the remote user.

* * * * *